United States Patent [19]

Lewiner et al.

[11] 4,263,589

[45] Apr. 21, 1981

[54] DEVICES FOR DETECTING THE RUPTURE OF AN ELECTRICAL CIRCUIT ELEMENT

[76] Inventors: Jacques Lewiner, 5, rue Bory d'Arnex, 92210 Saint-Cloud; Gérard Dreyfus, Rue du Viaduc, Villebon sur Yvette, 91120 Palaiseau; Didier Perino, 10, rue de Bellevue, 92150 Suresnes, all of France

[21] Appl. No.: 59,105

[22] Filed: Jul. 19, 1979

[30] Foreign Application Priority Data

Jul. 25, 1978 [FR] France ............................. 78 22015

[51] Int. Cl.³ .............................................. G08B 21/00
[52] U.S. Cl. ................................... 340/638; 340/652
[58] Field of Search ............... 340/638, 639, 644, 652, 340/654; 361/170, 187, 104, 208, 194

[56] References Cited

U.S. PATENT DOCUMENTS

| 1,036,620 | 8/1912 | Hawley ............................. 340/652 |
| 2,495,981 | 1/1950 | Parkenson ........................ 340/638 |
| 2,637,020 | 4/1953 | Stegall ............................. 340/638 |
| 2,913,712 | 11/1959 | Lee ................................. 340/652 |
| 2,993,148 | 7/1961 | Pywell ............................. 340/638 |
| 3,045,167 | 7/1962 | Colaiaco .......................... 340/638 |
| 3,158,761 | 11/1964 | Bullock ........................... 361/194 |
| 3,460,079 | 8/1969 | Di Marco ........................ 361/208 |
| 3,634,735 | 1/1972 | Komatsu ......................... 361/194 |

FOREIGN PATENT DOCUMENTS

1219320 12/1958 France ................................... 340/652

Primary Examiner—Gerald L. Brigance
Attorney, Agent, or Firm—Larson, Taylor and Hinds

[57] ABSTRACT

The device comprises means for applying a DC voltage U as a function of the voltage taken from the terminals of a fuse between a fixed electrode and a movable electrode forming together a capacitor. The movable electrode is urged towards the fixed electrode by an electret fast to the latter and in the opposite direction by a magnet and by the voltage U. As soon as this voltage exceeds a threshold corresponding to the rupture of the fuse, the movable electrode swings over and closes a switch for warning purposes.

15 Claims, 2 Drawing Figures

DEVICES FOR DETECTING THE RUPTURE OF AN ELECTRICAL CIRCUIT ELEMENT

BACKGROUND OF THE INVENTION

The invention relates to devices for detecting the rupture of an electrical circuit element of low resistance, preferably a fuse, during the electrical supply to this circuit.

It relates more particularly, among such detection devices, to those which comprise means for forming a DC voltage U whose amplitude varies in the same direction as that of the voltage developed at any moment at the terminals of the element to be monitored and means for exploiting for signaling purposes or the like the overshoots of a given threshold $U_o$ by this voltage U.

It is a particular object of the invention to render detector devices of the type concerned such that they respond to the various exigencies of practice better than hitherto, and notably in that they do not consume any electrical current derived from the circuits of which the elements to be monitored form a part.

It is another object of the invention to provide detector devices which can be very simply adapted to the usual circuit elements without modification of the latter and whereof they ensure the desired monitoring action with great safety.

GENERAL DESCRIPTION OF THE INVENTION

The detector devices of the type concerned according to the invention are essentially characterized in that they comprise two capacitor-forming electrodes, of which one is movable with respect to the other, an electret, arranged between these two electrodes, of which the charge produces a field exerting on said electrodes an electrostatic force H tending to bring them mutually together, means for applying between the two electrodes the above voltage U in a direction such that the field which results therefrom is opposite that due to the electret and tends therefore to reduce the force H, and means with "scarcely reversible" action for urging the movable electrode constantly in the reverse direction to the force H, the urging force of the latter means and the charge of the electret being selected so that the overshoots of the threshold $U_o$ by the voltage U causes swings of the movable electrode from its resting position to its alert position, and the exploitation means being arranged so as to be sensitive to said swings.

In preferred embodiments, recourse is had to one and/or other of the following features:

the urging means with scarcely reversible action are of the magnetic type and constituted preferably by a fixed permanent magnet and by a part of magnetic material connected to the movable electrode, the urging means with scarcely reversible action are constituted by an elastic mechanism with dead center overshoot, the urging means with scarcely reversible action are constituted by a second electret arranged so that the movable electrode comes into contact with it at the end of its swings, a manual resetting member is provided to replace the movable electrode in its initial resting position after its swings, the swings of the movable electrode due to the overshoots of the voltage to be detected are manifested by the closing of an electrical switch actuating an alarm circuit, preferably visual, the means for forming the continuous voltage U comprise a voltage divider mounted at the terminals of the circuit element to be monitored, a rectifying bridge, a filtering capacitor, and if necessary a voltage limiter.

The invention comprises, apart from these main features, certain other features which are preferably used at the same time and which will be more explicitly considered below.

BRIEF DESCRIPTION OF THE DRAWINGS

In the following description, some preferred embodiments of the invention are described with reference to the accompanying drawing given, of course, purely by way of non-limiting illustration.

DESCRIPTION OF PREFERRED EMBODIMENTS

Figure 1:
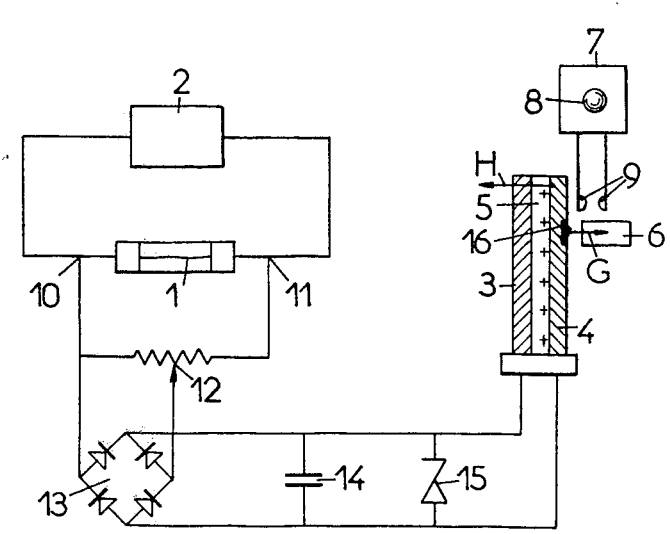
FIGS. 1 and 2, of this drawing, show very diagrammatically, respectively in its surveillance or resting state and in its alarm state, an embodiment of the detector device of the rupture of a fuse constructed according to the invention.

The fuse concerned, denoted by the reference numeral 1, is designed to protect an electrical circuit 2 against excessive currents and it is for this purpose mounted in series in the electrical supply of this circuit.

The fuse rupture detector 1 comprises:

a capacitor formed from two armatures or parallel conducting electrodes, of which one, 3, is fixed and the other, 4, movable, with the interposition of an electret 5, that is to say an electrically charged dielectric sheet, this electret being fast to the fixed electrode 3, A member 6 adapted to urge constantly the movable electrode 4 from its resting position, along the arrow G, with a "scarcely reversible" action as defined below, and an exploitation circuit 7, notably with signal lamp 8, including an electrical actuating switch 9 reversibly operable by the swings of the movable electrode 4.

The electrodes 3 and 4 may have various forms and natures, depending on the physical variable controlled (electrical, optical, pneumatic). They may be gridded, porous, solid, in thin layers produced by vacuum deposition or by an electro-chemical process, deposited on polymer sheets, stretched on frames, etc.

The electret 5 is advantageously constituted by a thin sheet of a polymer based on fluorinated polymer or a substituted polyolefine of thickness comprised between 1 micron and 1 cm.

The surface density of its charges may be comprised between $10^{-12}$ Cb/cm$^2$ and $10^{-4}$ Cb/cm$^2$.

These charges, shown symbolically by the sign + in the drawing, generate a field which exerts on the movable electrode 4 an electrostatic force H tending to bring it closer to the fixed electrode and hence in the direction opposite the force G.

The two electrodes 3 and 4 are connected electrically to the two terminals 10 and 11 of the fuse 1 so that there is applied between these electrodes a DC voltage U of amplitude proportional to that developed between these terminals, and this in a direction such that the field which results therefrom is opposite that produced by the electret and hence tends to reduce the force H.

This electrical connection may be direct if the voltage capable of being developed at the terminals of the fuse in continuous and compatible with the surface density of the charge of the electret.

If not, and as shown diagrammatically in the drawing, said connection is indirect and ensured notably through successively a voltage divider 12, a rectifier bridge 13, a filtering capacitor 14, and if necessary in addition, a voltage limiter such as a Zener diode 15 in series with a resistor 18 or a spark gap.

By "scarcely reversible" action qualifying the mode of operation of the member 16, is meant here an action of the "avalanche" type, that is to say which is amplified after its initiation by eliminating thenceforth any hesitation.

A simple return spring could hence not constitute this member 6.

In the preferred embodiments, said member 6 is constituted by a fixed permanent magnet adapted to close its magnetic circuit inside an armature 16 of magnetic material forming part of the movable electrode 4 or attached to the latter.

It is known in fact that the magnetic attraction exerted by the magnets on the armature 16 is inversely proportional to the square of the distance between these two elements: for this reason, said magnetic attraction is relatively weak as long as the movable electrode 4 is applied against the electret 5, which ensures good stability of the assembly in the monitoring state, notably with respect to shocks.

On the other hand, as soon as the movable electrode 4 commences to separate from the electret 5, the urge to move away increases rapidly, which ensures free actuation of the device.

Finally, the magnetic attractive force between the magnet and the movable electrode becomes a maximum at the end of the stroke of the latter, which ensures firm maintenance of the latter in its end-of-stroke position as well as of the switch 9 in its actuated position.

It will be observed that this sudden swinging action of the movable electrode 4 is facilitated by the fact that the electrostatic attractions exerted between the movable electrode 4 and both the electret 5 and the fixed electrode are, these also, inversely proportional to the square of the distance between said movable electrode and the two said fixed elements.

The "scarcely reversible" action defined above could be produced in other ways.

For example, the solliciting or biasing member 6 could be constituted by an elastic mechanism with dead center overshoot coupled to the movable electrode 4.

Or again it could be constituted by a second electret adapted to receive the movable electrode 4 flattened against it at the end of its swing stroke, the polarization of the charges of the second electret being the same as that of the charges of the first.

According to yet another modification, and to increase the electrostatic force due to the intervention of the second electret, it is possible to provide a third one directly fastened to the surface, of the movable electrode 4, arranged facing this second electret: in this case, the polarities of the charges borne respectively by the second and by the third electret are opposite.

Figure 2:
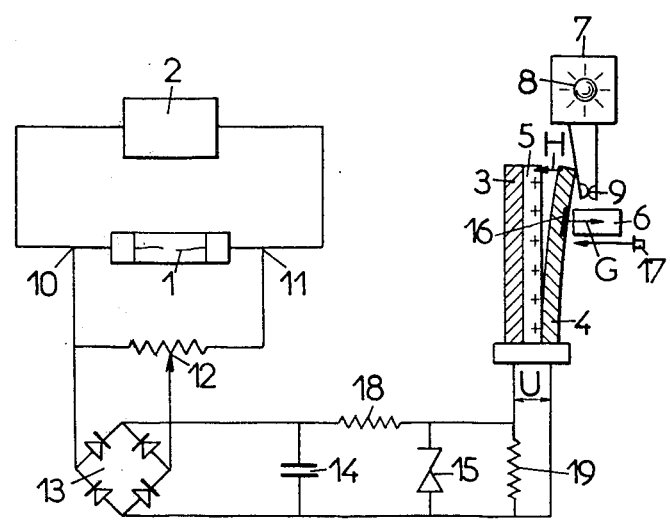

The electret 5 and the urging member 6 are selected so that the movable electrode 4, subject to the results of the two opposed attractive forces G and H (reduced as a function of the voltage U) swings from its monitoring position, shown in FIG. 1, to its warning position, shown in FIG. 2, when the value of said voltage U exceeds a predetermined threshold $U_o$.

In the present case, the value of this threshold $U_o$ could be very approximate and selected as equal to any one of those comprised between a minimum value $U_m$ corresponding to the intact condition of the fuse 1 and a maximum value $U_M$ corresponding to the rupture of this fuse.

The operation of the detector device described above is in fact as follows.

In the surveillance state, the fuse 1 is intact and as its resistance is very low, the potential difference formed between its terminals 10 and 11 is itself very low and even practically nil, hence likewise the voltage $U_m$ obtained by rectification from it and applied between the electrodes 3 and 4 and the reduction which results therefrom of the electrostatic "sticking" force of the two electrodes.

Under these conditions, this force H remains higher than the opposing magnetic attractive force G, due to the magnet 6: the electrode 4 remains therefore flattened against the electret 5, the switch 9 remaining open and the warning lamp is unlit (FIG. 1).

If an excess current appears in the circuit 2, sufficient to blow the fuse 1, the potential difference appearing at the terminals of the latter increases suddenly to become practically equal to the supply voltage of this circuit.

A relatively high DC voltage $U_M$ is then suddenly applied between the electrodes 3 and 4.

The field which results from this voltage $U_M$ reduces the maintenance electrostatic force H due to the electret sufficiently for the latter to become suddenly less than the opposing separating magnetic force G exerted by the magnet 6: there is then observed a sudden swing of the movable electrode 4 from its monitoring position to its warning position (FIG. 2), which swing is exploited so as to close the switch 9, which lights the signal lamp 8.

By reason of the "scarcely reversible" character of this sudden swinging, this warning state is maintained firmly until the replacement of the fuse 1.

The simple replacement of this fuse does not then suffice to bring the detector into its initial resting position: the detector must also be reset.

By the arrowed push-button 17 there is shown diagrammatically in FIG. 2 such a resetting system, which may be very simply actuated by mere pressure of a finger on a button arranged facing the movable electrode or by an electromagnetic control.

However, the resetting concerned could be produced by other than mechanical means, for example, by temporarily applying to the terminals of electrodes 3 and 4, a DC voltage of sufficient amplitude and of opposite direction to the above voltage U, or again, if the device comprises the magnet 6 and the armature 16 above, by applying to the assembly a sufficiently intense magnetic field of direction opposite that created by the magnet 6, or by inserting a magnetic shim between the magnet 6 and the armature 16, which closes the corresponding magnetic circuit by short circuit: the latter formula ensures not only the resetting of the detector device, but also its subsequent neutralization until the disengagement of the shim, which may be advantageous in certain cases.

To facilitate electrically the above resetting, it may be advantageous to connect between the two electrodes 3 and 4, a resistor 19 of high value.

The assembly of electrodes 3, 4, of electret 5, of switch 9 and of urging member 6 may be placed in a hermetic enclosure, either evacuated, or filled with a neutral gas, if necessary under pressure.

A particularly advantageous application of the above detector is the simultaneous surveillance of the state of a plurality of fuses.

One such detector is then associated with each fuse.

Each of these detectors may then be arranged so as to energize an individual alarm circuit in the case where it is desired to be able to identify instantaneously the fuses whose rupture has been detected.

If on the contrary, it is desired simply to be informed of the blown state of one at least of the fuses, it suffices to energize one and the same alarm circuit from various switches 9 associated with the fuses.

In the latter case the identification of each blown fuse can then be easily ensured by their simple observation or again by examination of the closed or not closed states of the switches 9.

As a result of which, and whatever the embodiment adopted, a fuse rupture detector is produced whose constitution and operation are clear from the foregoing.

These detectors have a certain number of advantages with respect to those previously known: in particular, they do not consume any electrical current drawn from the circuit to be protected, both in their monitoring state and their alarm state, they are adaptable to any fuse without modification of the latter and their operation is particularly positive considering that the position of their movable electrodes corresponding respectively to the two states of surveillance and of warning are remarkably stable and not sensitive to shocks.

As is self-evident and as emerges already from the foregoing, the invention is in no way limited to those of its types of application and embodiments which have been more especially envisaged; it encompasses, on the contrary, all modifications, notably:

those where the electrical circuit elements whose rupture forms the subject of the detection would be conductors or components of low electrical resistance other than fuses, which would permit for example the detection of the appearance of defective contacts, notably in relays or contactors those where the swings of the movable electrode would be exploited so as to trigger another actuation than the closing of an electrical switch, notably the opening of such a switch or again the deflection or masking of a light beam or even the closure or opening of a fluid passage orifice, those where the control ensured by the swings concerned would not be ensured directly but would bring into play an intermediate amplifying device, those where the electret would be fast to the movable electrode instead of being fast to the fixed electrode, those where an insulating spacing shim would be inserted between the electret and the facing electrode to which it is not fast, so as to reduce the risk of accidental discharge of the electret and hence to increase the lifespan thereof.

We claim:

1. Device for detecting the rupture of an electrical circuit element of low resistance, said device comprising means for forming a DC voltage $U$ of which the amplitude varies in the same direction as that developed at each moment at the terminals of the element to be monitored and means for exploiting for signaling purposes or the like the overshoot of a given threshold $U_o$ by this voltage $U$, comprising two electrodes forming a capacitor, of which one is movable with respect to the other between a monitoring position and a warning position, an electret arranged between these two electrodes, whose charge produces a field exerting on said electrodes and electrostatic force H tending to bring them mutually together toward the monitoring position, means for applying between the two electrodes the voltage $U$ in a direction such that the field which results therefrom is opposed to that due to the electret and hence tends to reduce the force H, and means with scarcely reversible action for urging constantly the movable electrode in reverse direction to the force H, the force of these latter means and the charge of the electret being selected so that the overshoots of the threshold $U_o$ by the voltage $U$ cause swings of the movable electrode from its monitoring position to its warning position, and the exploiting means being arranged so as to be sensitive to said swings.

2. Detector device according to claim 1, wherein the urging means with scarcely reversible action are of the magnetic type.

3. Detector device according to claim 2, wherein said urging means are constituted by a fixed permanent magnet and by a part of magnetic material connected to the movable electrode.

4. Detector device according to claim 1, wherein the urging means with scarcely reversible action are constituted by an elastic mechanism with dead center overshoot.

5. Detector device according to claim 1, wherein the urging means with scarcely reversible action are constituted by a second electret arranged so that the movable electrode comes into contact with it in the warning position.

6. Detector device according to claim 1, comprising a resetting member to replace the movable electrode in its monoitoring position after its swings.

7. Detector device according to claim 2, comprising a manual resetting member to replace the movable electrode into its monitoring position after its swings.

8. Detector device according to claim 3, comprising a manual resetting member to replace the movable electrode into its monitoring position after its swings.

9. Detector device according to claim 4, comprising a manual resetting member to replace the movable electrode into its monitoring position after its swings.

10. Detector device according to claim 5, comprising a manual resetting member to replace the movable electrode into its monitoring position after its swings.

11. Detector device according to claim 6, for which the urging means with scarcely reversible action are of the magnetic type, the resetting being ensured by a magnetic short circuit.

12. Detector device according to claim 1, wherein the swings of the movable electrode to the warning position due to the voltage overshoots are detected by the closing of an electrical switch actuating a warning circuit.

13. Detector device according to claim 12, wherein said warning circuit is visual.

14. Detector device according to claim 1, wherein the means for forming the DC voltage $U$ comprise a voltage divider connected to the terminals of the circuit element to be monitored, a rectifying bridge, a filtering capacitor and, if necessary, a voltage limiter.

15. Detector device according to claim 1, wherein said electrical circuit element is a fuse.

* * * * *